United States Patent [19]
Giordano et al.

[11] Patent Number: 5,859,180
[45] Date of Patent: Jan. 12, 1999

[54] PROCESS FOR THE SOLID STATE POLYCONDENSATION OF POLYAMIDE RESINS

[75] Inventors: Dario Giordano, Tortona; Riccardo Bianchi, Naples, both of Italy

[73] Assignee: Sinco Engineering S.p.A., Italy

[21] Appl. No.: 948,949

[22] Filed: Oct. 10, 1997

[30] Foreign Application Priority Data

Oct. 25, 1996 [IT] Italy ................... MI96A2215

[51] Int. Cl.$^6$ ................... C08G 69/28
[52] U.S. Cl. ................... 528/347; 528/310; 528/322; 528/332; 528/335; 528/336; 528/480
[58] Field of Search ................... 528/310, 347, 528/335, 332, 336, 322, 480

[56] References Cited

U.S. PATENT DOCUMENTS

| | | |
|---|---|---|
| 3,821,171 | 6/1974 | Beaton . |
| 5,576,415 | 11/1996 | Tanaka ................... 528/310 |

FOREIGN PATENT DOCUMENTS

| | | |
|---|---|---|
| 0 732 351 (A3) | 9/1896 | European Pat. Off. . |
| 0 038 094 | 3/1981 | European Pat. Off. . |
| 0 717 061 (A2) | 6/1996 | European Pat. Off. . |
| 0 717 061 (A3) | 6/1996 | European Pat. Off. . |
| 0 732 351 (A2) | 9/1996 | European Pat. Off. . |
| 1 770 410 | 3/1972 | Germany . |
| 27 23 549 | 12/1978 | Germany . |
| 248 130 A1 | 7/1987 | Germany . |
| MI96A2158 | 10/1996 | Italy . |

OTHER PUBLICATIONS

"Molecular Model For Solid–State Polymerization of Nylon 6. II. An Improved Model;" Journal of Applied Polymer Science, vol. 53, 85–103 (1994), M. Kul Karni and S. Gupta.
1) European Search Report EP 97 11 8140; Feb. 2, 1998.
2) Mukund R. et al, "Molecular Model for Solid State Polymerization of Nylon 6.II. An Improved Model," Journal of Applied Polymer Science, vol. 53, 1994, pp. 85–103. The month in the date of publication is not available.

*Primary Examiner*—P. Hampton-Hightower
*Attorney, Agent, or Firm*—Edward D. Manzo; Mark J. Murphy

[57] ABSTRACT

Process for the solid state polycondensation of polyamide resins by the use in the polycondensation reactor of a quantity of an inert gas such that the ratio by weight between the solid capacity/h at the reactor outlet and that one of gas fed into the reactor is lower than 0.5.

10 Claims, No Drawings

PROCESS FOR THE SOLID STATE POLYCONDENSATION OF POLYAMIDE RESINS

BACKGROUND OF THE INVENTION

The present invention relates to a process for the solid state polycondensation of polyamide resins.

Polyamide resins, particularly PA6, PA6,6, PA11, PA12 and their copolymers, find wide application in both the fibres and flexible packaging area, and in articles produced by extrusion and blowing technologies.

While for fibres the relative viscosity of the resin is low (RV=2.4–3.0 for PA6), for applications in the flexible packaging area and for the articles produced by extrusion/blowing technologies, higher relative viscosities are necessary (RV=3.2–50 for PA6).

The viscosity is increased to the required values (higher than 3) by means of SSP processes of the resin at temperatures between 140° C. and 240° C. in conformity with the type of polyamide used.

SSP processes are known for example from patent application EP-A-0 038 094, which describes a SSP process for polyamide 4, 6. In particular, the '094 application indicates a possibility of using phosphoric acid to accelerate the solid state reaction.

In U.S. Pat. No. 3,821,171, there is described a SSP process, wherein the chip is at first heated outside the reactor, and the heating phase is completed in the reactor. This heating can be made by using an inert gas, in particular nitrogen.

The SSP of 6 type polyamides was studied by M. R. Kulkarni and S. K. Gupta (Molecular Model for Solid State Polymerisation of Nylon 6.II. An improved model—Journal of Applied Polymer Science Vol. 53, 85–103 (1994)). On pages 95 and 96, it is indicated and reported in a graph, that the negative effect on the polycondensation kinetics of water concentration appears for concentration values higher than 0.001 mol/kg. In particular, the polymer reactivity is reduced, and the effect is evident for residence times higher than 6 hours. For this reason, it is necessary to reduce the water concentration in the vapour phase surrounding the solid phase by increasing the inert gas stream and/or reducing the vacuum level at which the present polycondensation reaction is carried out.

It results that by using a concentration of 0.01 mol/kg there is a reactivity reduction of about 15%.

SUMMARY OF THE INVENTION AND DETAILED DESCRIPTION OF THE PRESENTLY PREFERRED EMBODIMENTS

It has been unexpectedly found, contrary to the expectations, that it is possible to conduct the SSP reaction without the kinetic of the polycondensation reaction decreasing even when operating with an inert gas flow in the SSP reactor, leading to a water concentration in the reactor higher than 0.01 mol/kg of polymer.

The R ratio between the capacity/h (throughput/h) by weight of the inert gas fed into the polycondensation reactor and the capacity/h by weight of the polymer at the reactor outlet in the process of the present invention is lower than 0.5, preferably between 0.05 and 0.3.

The SSP reactor used is a moving bed reactor, wherein the resin enters from the top and comes out the bottom, and the inert gas stream (preferably nitrogen) is circulated in countercurrent or equicurrent.

According to a preferred embodiment, the polymer is first preheated in heating equipment, which increases the temperature of the solid to the reaction temperature (between the glass transition temperature and the polymer melting temperature). The polymers subsequently fed into the SSP reactor, where the reaction temperature is kept for the time necessary to obtain the desired polymerization degree measured as the relative viscosity value. The reaction temperature is in general between 10° and 40° C. lower than the melting temperature.

The inert gas stream coming out from the reactor is subjected, before being recycled into the reactor, to purification and drying processes carried out according to known methods for the removal of the organic impurities therein present and water. The water content in the recycled gas is decreased to values lower than 100 ppm and preferably lower than 3 ppm. The organic impurities are kept lower than 10 ppm.

The polymer coming out from the polymerization reactor is cooled by using fluid bed equipment or equipment with solid/wall cooling.

It is particularly convenient to use a system such as that described in Applicant's Italian application No. MI96A002158.

The average residence times in the reactor are such as to obtain an increase of the polymer relative viscosity of at least 0.3 units. In general, the average residence times are between 6 and 20 hours.

The process is used for resins with relative viscosity lower than 3.3, and in general lower than 2.2, and in particular with a relative viscosity between 2.0 and 2.6.

The relative viscosity is measured at 25° C. in a 1% by weight resin solution in sulphuric acid concentrated at 96%. The resins are preferably formed of PA6, PA6,6, PA11, PA12 or copolymers or mixtures of the same.

The following examples are given to illustrate but not to limit the present invention.

EXAMPLE 1

The solid state upgrading was carried out in a continuous reactor with a moving bed and with a solid capacity of 40 kg/h.

The material used was Nylon 6 with a starting relative viscosity of 2.5.

A polymer with a final viscosity of 3.3 was produced keeping constant the average temperature of the reactor and changing only the inert gas quantity (nitrogen) (changing therefore the R ratio).

The fed nitrogen contained less than 100 ppm water and less than 10 ppm of organic compounds.

The average residence time was 18 hours.

The results obtained are shown in Table 1.

COMPARATIVE EXAMPLE 1

The test of example 1 was repeated using a R ratio equal to 5 to reduce to a minimum the water concentration in the gaseous phase (Cw=0.0019 mol/kg). The starting polymer was the same as in example 1, and the reaction temperature and the residence time were kept constant.

The relative viscosity of the obtained polymer was 3.3.

EXAMPLE 2

The solid state upgrading was carried out in a continuous reactor with a moving bed wherein a solid capacity of 40 kg/h was fed.

The material used was Nylon 6.6 with a starting relative viscosity of 2.6.

A polymer with a final viscosity of 4.2 was produced, keeping constant the average temperature of the reactor and changing only the inert gas quantity (nitrogen) (changing therefore the R ratio).

The fed nitrogen contained less than 100 ppm of water and less than 10 ppm of organic compounds.

The residence time used was 16 hours.

The results obtained are shown in Table 2.

COMPARATIVE EXAMPLE 2

The test of example 2 was repeated using a R ratio equal to 5 to reduce to a minimum the water concentration in the gaseous phase. The starting polymer was the same, and the reaction temperature and the average residence time were kept constant.

The relative viscosity of the obtained polymer was 4.2.

TABLE 1

|  | Test No. | | | | |
| --- | --- | --- | --- | --- | --- |
|  | 1 | 2 | 3 | 4 | 5 |
| Nitrogen quantity (kg/h) | 2 | 4 | 8 | 12 | 20 |
| R ratio | 0.05 | 0.1 | 0.2 | 0.3 | 0.5 |
| Average Temp. (°C.) | 176 | 176 | 176 | 176 | 176 |
| Final relative viscosity | 3.32 | 3.32 | 3.32 | 3.32 | 3.32 |
| Cw (mol/kg) | 0.748 | 0.374 | 0.191 | 0.128 | 0.079 |

Cw = water concentration

TABLE 2

|  | Test No. | | | | |
| --- | --- | --- | --- | --- | --- |
|  | 6 | 7 | 8 | 9 | 10 |
| Nitrogen quantity (kg/h) | 2 | 4 | 8 | 12 | 20 |
| R ratio | 0.05 | 0.1 | 0.2 | 0.3 | 0.5 |
| Average Temp. (°C.) | 196 | 196 | 196 | 196 | 196 |
| Final relative viscosity | 4.21 | 4.20 | 4.21 | 4.20 | 4.20 |

What is claimed is:

1. Process for the solid state polycondensation of polyamide resins wherein the resin is fed into a moving bed reactor and an inert gas is circulated countercurrent or equi-current with the resin, wherein the ratio R by weight between the gas capacity/h and the polymer capacity/h discharged from reactor is lower than 0.5.

2. Process according to claim 1, wherein the ratio R is between 0.05 and 0.30.

3. Process according to claim 1, wherein the polyamide is selected from the group consisting of Nylon 6, Nylon 6,6 and Nylon 12 and copolymers and/or mixtures of the same.

4. Process according to claim 1, wherein the inert gas is nitrogen.

5. Process according to claim 4, wherein the nitrogen coming from the reactor is recycled into the reactor after having under gone a purification process, wherein the water is reduced to values lower than 3 ppm.

6. Process according to claim 1, wherein the polyamide has a relative viscosity lower than 2.

7. Process according to claim 1, wherein the temperature of the resin in the reactor is from 10° C. to 40° C. lower than the resin melting point and the residence time is for a period of time in order to obtain an increase of the relative viscosity of at least 0.3 units.

8. Process according to claim 3, wherein the polyamide has a relative viscosity lower than 2.

9. Process according to claim 6, wherein the temperature of the resin in the reactor is from 10° C. to 40° C. lower than the resin melting point and the residence time is for a period of time in order to obtain an increase of the relative viscosity of at least 0.3 units.

10. Process according to claim 8, wherein the temperature of the resin in the polycondensation reactor is from 10° C. to 40° C. lower than the resin melting point and the residence time is for a period of time in order to obtain an increase of the relative viscosity of at least 0.3 units.

* * * * *